Sept. 23, 1952 W. G. WEEKS 2,611,404
FOOD DICER
Filed Feb. 23, 1949
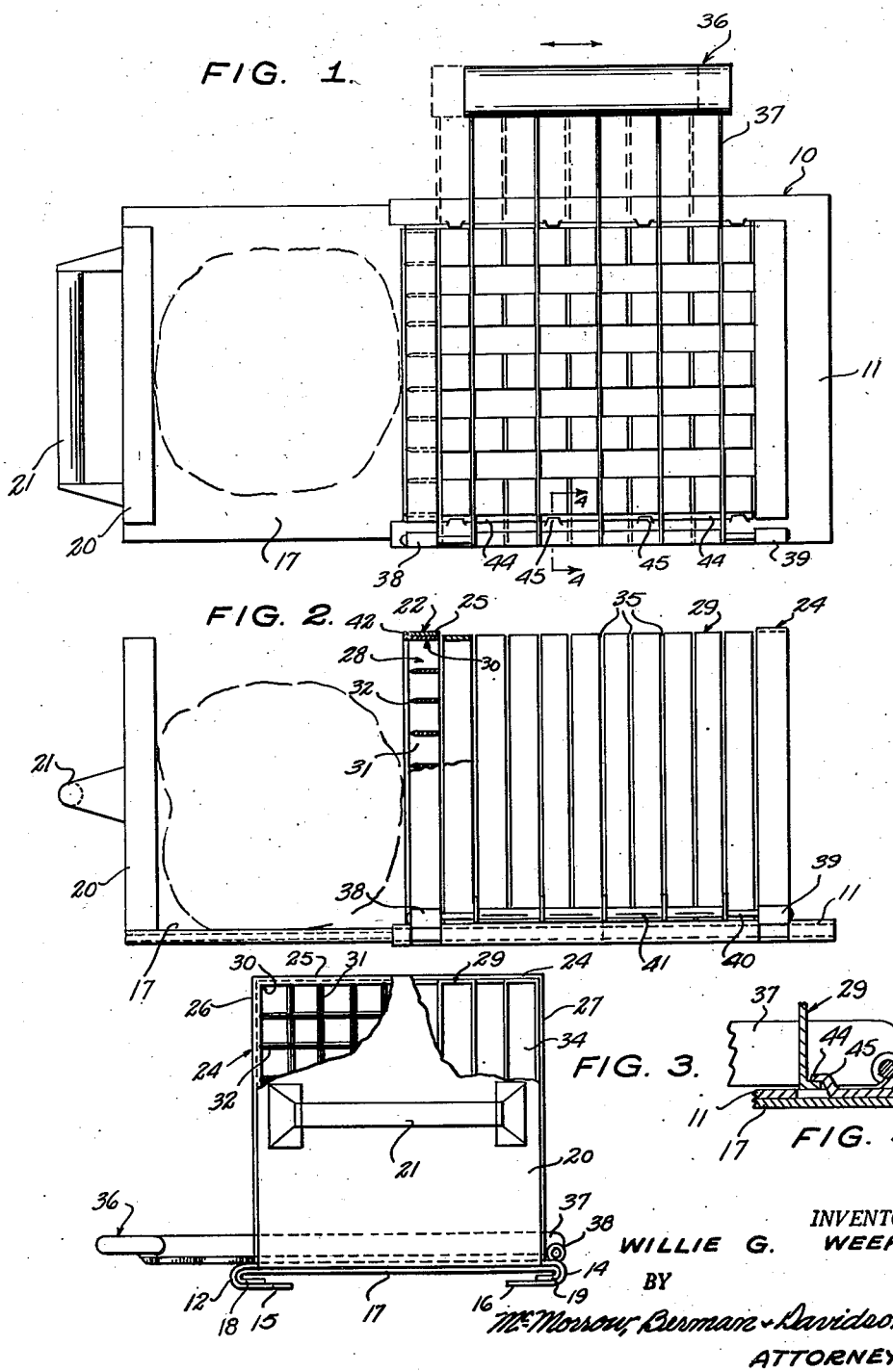
INVENTOR.
WILLIE G. WEEKS,
BY
McMorrow, Berman & Davidson
ATTORNEYS.

Patented Sept. 23, 1952

2,611,404

UNITED STATES PATENT OFFICE 2,611,404

FOOD DICER

Willie G. Weeks, Port Tampa City, Fla.

Application February 23, 1949, Serial No. 77,907

1 Claim. (Cl. 146—78)

This invention relates to an improved food dicing implement particularly designed and arranged for home kitchen use.

It is an object of this invention to provide a food dicer of the kind to be more particularly described hereinafter having a sliding member for pressing the article of food to be cut longitudinally of the supporting frame and having swingable cutter knives for dicing the longitudinally formed strips of the food.

Another object of this invention is to provide a food dicer of this kind having cutting knives removably supported at one end of a base plate and cut food supporting members removably mounted on the base whereby the knives and supporting members may be readily removed for cleaning or replacement by different sized cutters and cut food supporting members.

Another object of this invention is to provide a food cutting and dicing device of this kind for kitchen or home use with small quantities of food which may be readily operated or actuated by a housewife in cutting potatoes, onions and other vegetables.

With the above and other objects in view, my invention consists in the arrangement, combination and details of construction disclosed in the drawings and specification and then more particularly pointed out in the appended claim.

In the drawings:

Figure 1 is a top plan view of a food dicer constructed according to an embodiment of my invention.

Figure 2 is a side elevation thereof, partly broken away and partly in section.

Figure 3 is a front end elevation of the food dicer, partly broken away and partly in section.

Figure 4 is a fragmentary, detail section, taken on the line 4—4 of Figure 1.

Referring to the drawings, the numeral 10 designates generally a food dicer for home use for cutting and dicing potatoes, onions and other vegetables, the food dicer 10 being of a suitable size for operation by a housewife.

The food dicer 10 comprises a flat base plate 11 having downwardly and laterally inwardly turned side edges forming guide channels 12 and 14 along the sides thereof. The channels 12 and 14 provide longitudinally extending flanges 15 and 16 respectively spaced below the lower surface of the flat plate 11.

A food carrier plate 17 is slidably supported beneath the base plate 11 with its side edges in the channels 12 and 14 for longitudinal sliding movement relative to the base plate 11. The side edges of the food carrying plate 17 are folded inwardly downwardly and inwardly to provide beads 18 and 19 which are slidably engaged in the channels 12 and 14. A vertical pusher plate 20 is fixed to or formed on the extreme rear end of the carrier plate 17. A handle 21 is fixed on the rearward side of the pusher plate 20 for sliding the carrier plate 17 along the length of the base 11.

A pair of rectangular frame members 22 and 24 are fixed on the opposite ends of the base plate 11 and extend upwardly therefrom. The base plate 11 constitutes the bottom bar or frame member of both of the frames 22 and 24 and the connecting means between them. Each of the frame members, 22 and 24, are formed with a horizontal top wall 25 and depending side bars or arms 26 and 27. The lower ends of the side bars 26 and 27 are fixed to the upper side of the base 11 and the upper ends of the side bars are fixed to, or preferably formed integral with the opposite ends of the horizontal transverse bar 25. The rear frame member 22 supports a reticulated cutting member 28 therein and the forward frame member 24 supports a cut food supporting member 29.

The reticulated cutting member 28 is formed of a rectangular frame 30 having a plurality of cutting blades fixed therein. Transversely spaced apart cutting blades 31 intersect with and engage with a plurality of vertically spaced apart horizontal cutting blades 32. The cutting blades 31 and 32 form a honeycomb of cutting edges through which the food to be diced must initially be engaged. The extreme outer end of the cutting blades 31 and 32 are fixed to the inner sides of the frame 30.

The cut food retaining or supporting member 29 is formed of a flat sheet of metal bent into a zigzag configuration transversely thereof to provide a plurality of longitudinally extending passages or openings 34. The openings 34 are disposed for longitudinal alignment with the openings between the transverse and vertical cutting blades 31 and 32. The cut food retaining member 29, thus formed is open at the top in the alternate grooves 34 and open at the bottom on the other grooves. The food retaining member 29 is open at the opposite ends thereof, one end for receiving the cut food from the reticulated cutting member, and the other end for discharging the longitudinally sliced or diced food.

The cut food retaining member 29 is formed with a plurality of transversely extending slots or passages 35 which are spaced apart a distance equal to the depth and width of the squares formed by adjacent ones of the cutting blades 31 and 32.

A transverse cutting member 36 is swingably mounted at one end on the base 11 and has a plurality of cutting blades 37 engageable in the slots or passages 35.

A pair of hinge barrels 38 and 39 are fixed to or formed on one side edge of the base 11 substantially in transverse alignment with the forward and rear frames 22 and 24 respectively. A longitudinally extending pin or pintle 40 is engaged in the hinge barrels 38 and 39, and extends along the length of the base plate 11. The transversely swinging cutting member 36, having the longitudinally spaced apart cutting blades 37, is formed with a longitudinally extending hinge barrel 41 which is fixed on one end of the cutting blades 37. The hinge pin 40 engages through the barrel 41 for pivotally mounting the cutting member 36 on the base 11. The hinge barrel 41 does not extend the full length of the distance between the hinge barrels 38 and 39 but is slidable along the hinge pin 40 so that the cutting blades 37 may be disposed at a selected position along the length of the hinge pin 40 for disposition in selected ones of the transverse slots or passages 35. The cutting members 37 may be spaced apart a distance greater than the longitudinal distance between adjacent ones of the slots 35 to provide for larger size dices of food.

In the use and operation of the food dicer 10, the reticulated cutting member 28 is initially placed within the forwardmost frame 22. The frame 30 is slidably engaged within the frame 22 and an upwardly extending flange 42, fixed on the forward edge of the top frame member of the frame 30, is adapted to engage the forward side of the uppermost frame member 25, of the frame 22, for limiting the sliding movement of the reticulated cutting member 28 within the supporting frame 22. The cut food retaining member 29 is slidably engaged from the rear, through the rearmost of the frames, the frame 24, in such a manner that the outturned flanges 44, on the lower edge of the extreme outermost walls will slidably engage beneath the upwardly struck tangs or guide members 45, formed in the bottom wall or base 11. In this manner the cut food retaining member 29 is slidably engaged within the rearmost frame 24 to be positioned in longitudinal alignment with the frame 22, and the reticulated cutting member 28.

The article of food to be diced, is initially placed on the food carrier plate 17, extended forwardly from the base 11. The operator will move the food carrier plate 17 rearwardly by grasping the handle 21 and pushing the wall 20 in the direction of the cutting member 28. The article of food will be initially cut into elongated strips through the cubicle cutting elements 31 and 32, and when the wall 20 is disposed closely adjacent the frame 22, the transverse cutting member 26 may be swung from an outwardly extended position through the openings 35 for cutting the longitudinally cut food elements. By swinging the cutting member 36 back to its original position, the cubicle or diced food elements are free to fall from the open rear end of the device.

I do not mean to confine myself to the exact details of construction herein disclosed, but claim all variations falling within the purview of the appended claim.

What I claim is:

In a food dicer, a base plate, guide channels formed on the opposite longitudinal side edges of said plate and positioned at the lower side of said base plate, a food carrier plate having longitudinal side edges slidably engaged in said guide channels for longitudinal movement of said carrier plate relative to said base plate, a vertical reticulated cutter fixed on and rising from one end of said base plate, a vertical pusher plate fixed on and rising from said carrier plate for pushing food on said carrier plate through said reticulated cutter as said carrier plate is moved longitudinally relative to said base plate in one direction, cut food supporting means on said base plate at the side of said reticulated cutter remote from said pusher plate, said means including sidewalls formed with longitudinally spaced vertical slots, and a bladed cutter hinged on a longitudinal edge of said base plate and comprising blades extending crosswise of said base plate and arranged to pass through the slots in the sidewalls and cut food present in said food supporting means as said bladed cutter is swung downwardly toward said base plate from an elevated position.

WILLIE G. WEEKS.

REFERENCES CITED

The following references are of record in the file of this patent:

UNITED STATES PATENTS

| Number | Name | Date |
|---|---|---|
| 57,111 | Forschner | Aug. 14, 1866 |
| 714,943 | Perkins | Dec. 2, 1902 |
| 792,396 | Buell | June 13, 1905 |
| 1,477,421 | Brooks | Dec. 11, 1923 |
| 2,141,527 | French | Dec. 27, 1938 |
| 2,413,160 | Witmer | Dec. 24, 1946 |

FOREIGN PATENTS

| Number | Country | Date |
|---|---|---|
| 439,927 | France | Apr. 20, 1912 |
| 662,188 | Germany | July 22, 1938 |